United States Patent
Zhang et al.

(10) Patent No.: US 9,237,536 B2
(45) Date of Patent: Jan. 12, 2016

(54) METHOD AND APPARATUS FOR PRIMARY SYNCHRONIZATION SIGNAL DETECTION

(75) Inventors: Zhongshan Zhang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 102 days.

(21) Appl. No.: 13/879,315

(22) PCT Filed: Mar. 14, 2011

(86) PCT No.: PCT/CN2011/000394
§ 371 (c)(1),
(2), (4) Date: Jun. 12, 2013

(87) PCT Pub. No.: WO2012/122668
PCT Pub. Date: Sep. 20, 2012

(65) Prior Publication Data
US 2013/0259024 A1     Oct. 3, 2013

(51) Int. Cl.
*H04W 56/00* (2009.01)
*H04J 11/00* (2006.01)
*H04J 13/00* (2011.01)
*H04L 27/26* (2006.01)

(52) U.S. Cl.
CPC ........... *H04W 56/00* (2013.01); *H04J 11/0073* (2013.01); *H04J 13/0062* (2013.01); *H04L 27/2675* (2013.01)

(58) Field of Classification Search
None
See application file for complete search history.

(56) References Cited

U.S. PATENT DOCUMENTS

| 2009/0010312 A1* | 1/2009 | Han et al. ............. 375/145 |
| 2010/0034305 A1* | 2/2010 | Popovic ............... 375/260 |
| 2011/0103534 A1* | 5/2011 | Axmon et al. ......... 375/371 |
| 2012/0281629 A1* | 11/2012 | Zhou et al. ............ 370/328 |

FOREIGN PATENT DOCUMENTS

| CN | 101188592 A | 5/2008 |
| CN | 101233701 A | 7/2008 |
| CN | 101502018 A | 8/2009 |
| CN | 101641924 A | 2/2010 |
| JP | 2010-509847 A | 3/2010 |
| JP | 2010-517452 A | 5/2010 |

OTHER PUBLICATIONS

Communication, dated Apr. 22, 2014, issued by the Japanese Patent Office, in counterpart Application No. 2013-542333.

(Continued)

*Primary Examiner* — Ian N Moore
*Assistant Examiner* — Latresa McCallum
(74) *Attorney, Agent, or Firm* — Sughrue Mion, PLLC

(57) ABSTRACT

The present invention discloses a method and an apparatus for primary synchronization signal (PSS) detection. The method may comprise: performing a central-symmetrical preprocess on a receive vector by exploiting a central symmetry of the primary synchronization signal; and performing, based on the central-symmetrical preprocess, a non-coherent detection on the receive vector using local primary synchronization signals so as to detect the primary synchronization signal. The computation complexity in PSS detection may be significantly reduced by performing preprocess to the receive vector based on the central symmetry of the primary synchronization signal, thereby considerably enhancing the speed and performance of PSS search and further improving the cell search efficiency.

7 Claims, 7 Drawing Sheets

(56) References Cited

OTHER PUBLICATIONS

Popovic, et al., "Primary Synchronization Signal in E-UTRA", 2008 IEEE 10th International Symposium on Spread Spectrum Technical and Applications, pp. 426-430.

Huawei, "P-SCH sequences", TSG RAN WG1 meeting #49, Kobe, Japan, May 7-11, 2007, R1-072321, 7 pages.

Chinese Office Action dated Oct. 29, 2015 issued in Chinese Application No. 201180059242.2.

* cited by examiner

METHOD AND APPARATUS FOR PRIMARY SYNCHRONIZATION SIGNAL DETECTION

CROSS REFERENCE TO RELATED APPLICATIONS

This application is a National Stage of International Application No. PCT/CN2011/000394 filed Mar. 14, 2011, the contents of which are incorporated herein by reference in their entirety.

FIELD OF THE INVENTION

The present invention relates to the technical field of the 3rd Generation Partnership Project (3GPP) Long Term Evolution (LTE), more particularly, to a method and an apparatus for primary synchronization signal (PSS) detection.

BACKGROUND OF THE INVENTION

The 3GPP LTE is envisioned to be a key technology for the next-generation wireless communications. The LTE network, also known as Evolved Universal Terrestrial Radio Access Network (E-UTRAN), has been standardized by the 3GPP. In the LTE system, Orthogonal Frequency-Division Multiple Access (OFDMA) is adopted as the down-link transmission scheme, while Single-Carrier Frequency-Division Multiple Access (SC-FDMA) technology is used for the User Equipments (UE) to up-link access the station device (eNodeB).

In the LTE system, a cell search process is a process for performing time and frequency synchronization between a UE and a cell and detecting a cell ID. To enable the UE to quickly obtain the frequency and synchronization information, a primary synchronization signal (PSS) and a secondary synchronization signal (SSS) are designed in the LTE system. Each cell is identified through the cell-ID information carried by in the primary synchronization signal and the secondary synchronization signal. In the LTE system, the Zadoff-Chu sequence (hereinafter referred to as ZC sequence) is used to generate a PSS sequence, and three cells in a cell group are differentiated by three groups of sequences with roots of 25, 29, and 34, respectively. For the sake of illustration, FIG. 1 illustrates a diagram of a frequency domain ZC sequence. As illustrated in FIG. 1, the ZC sequence has a length of 63, wherein 62 sub-carriers excluding s direct current (DC) carrier are modulated, while the direct current carrier at the central position is not modulated so as to avoid direct current components.

This ZC sequence has a good auto-correlation property, but has a very low cross-correlation property. In other words, its auto-correlation value is very high, but its cross-correlation value is relatively low. Based on this feature, a non-coherent detection algorithm may be used in PSS sequence detection. In other words, the PSS sequence may be detected by detecting the peak of coherent values.

FIG. 2 illustrates a diagram of PSS detection according to the prior art. As illustrated in FIG. 2, at a receiver (i.e., at a user equipment UE), the received vector is filtered by a filter, so as to filter out the content have no relation with the PSS and avoid interference from other sub-carriers to the PSS. Then, the coherent values between the obtained receiver vector and the three local ZC sequences are calculated.

In case of PSS, due to the correlation property unique to the ZC sequence, the detected PSS will be matched to a local ZC sequence; at this point, a partial peak appears in an output of the PSS root identification module; by using this peak, it may be exactly determined at the receiver which PSS sequence the receive vector is, thereby determining the cell-ID. In case that the PSS does not appear, the calculated maximum coherent value will be lower than the determination threshold Ti, and at this point, the start point index θ of the sequence is plus 1 to enter into the next operation.

Thus, in the existing PSS detection algorithm, all the three local sequences are compared with the received sequence one by one, so as to determine whether the receive vector matches one of the ZC sequences. Besides, although the PSS sequence transmission frequency in downlink transmission is not very high, which is once in 5 ms, it is required to detect all received symbols in a prior scheme, so as to prevent miss-detection to the PSS symbols. Because the PSS transmission frequency is relatively low, most of these detected symbols are data symbols. However, even so, it is still required to use the three local ZC sequences to determine whether a received symbol matches one of the ZC sequence, and the algorithm will continue detection on a following symbol until a mismatch is determined. Therefore, actually, most of the detection operations for PSS algorithms are consumed on these data symbols, instead of the PSS sequence. All of the above result in that such PSS detection algorithm greatly consumes the data processing capability at the receiver; therefore, it is a rather inefficient detection policy, which will seriously restrain the speed of UE access to a cell.

Therefore, there is an urgent need for an improved PSS detection scheme in the art.

SUMMARY OF THE INVENTION

In view of the above, the present invention provides an improved solution for primary synchronization signal detection so as to solve or at least partially mitigate at least a part of problems in the prior art.

According to one aspect of the present invention, there is provided a method for primary synchronization signal detection. The method may comprise: performing a central-symmetrical preprocess on a receive vector by exploiting a central symmetry of the primary synchronization signal; and performing, based on the central-symmetrical preprocess, a non-coherent detection on the receive vector using local primary synchronization signals, so as to detect the primary synchronization signal.

In one embodiment according to the present invention, the performing the central-symmetrical preprocess on the receive vector by exploiting the central symmetry of the primary synchronization signal may comprise: obtaining a preprocessed receive vector through shortening the length of the receive vector by exploiting the central symmetry of the primary synchronization signal. In this embodiment, the local primary synchronization signals have a same length as the preprocessed receive vector, and the non-coherent detection is preformed on the preprocessed receive vector based on the local primary synchronization signals.

In another embodiment according to the present invention, the obtaining the preprocessed receive vector through shortening the length of the receive vector may comprise: adding the corresponding data at symmetric positions in the receive vector to obtain the preprocessed receive vector.

In a further embodiment according to the present invention, the performing the central-symmetrical preprocess on the receive vector by exploiting the central symmetry of the primary synchronization signal may comprise: detecting whether the receive vector has a central symmetry property or not, and the non-coherent detection is preformed in response to determining that the receive vector has a central symmetry property.

In a still further embodiment, the detecting whether the receive vector has a central symmetry property or not may comprise: calculating the sum of coherent values of corresponding data at symmetric positions in the receive vector as a symmetry value; and determining, based on the symmetry value, whether the receive vector has a central symmetry property or not.

In a yet further embodiment according to the present invention, the determining, based on the symmetry value, whether the receive vector has a central symmetry property or not may comprise: determining that the receive vector has a central symmetry property when the symmetry value is not lower than a symmetry detection threshold.

In a still yet further embodiment, the primary synchronization signal detection is performed in a frequency or time domain in response to the setting about a frequency or domain detection in a communication system.

According to the second aspect according to the present invention, there is provided an apparatus for primary synchronization signal detection. The apparatus may comprise: central-symmetrical preprocess means configured for performing a central-symmetrical preprocess on a receive vector by exploiting a central symmetry of the primary synchronization signal; and non-coherent detection means configured for performing, based on the central-symmetrical preprocess, a non-coherent detection on the receive vector using local primary synchronization signals so as to detect the primary synchronization signal.

Further, according to the third aspect of the present invention, there is further provided a user equipment which may comprise an apparatus according to the second aspect of the present invention.

According to the embodiments of the present invention, the computation complexity in PSS detection may be significantly reduced by performing preprocess on the receive vector based on the central symmetry of the primary synchronization signal, thereby considerably enhancing the speed and performance of PSS search and further improving the cell search efficiency.

BRIEF DESCRIPTION OF THE DRAWINGS

The above and other features of the present invention will become more apparent through detailed description of the embodiments as illustrated with reference to the accompanying drawings. In the accompanying drawings of the present invention, like reference signs indicate like or similar components. In the accompanying drawings, FIG. 1 schematically illustrates a diagram of a frequency domain ZC sequence in the prior art.

DETAILED DESCRIPTION OF EMBODIMENTS

Hereinafter, reference will be made to the companying drawings to describe a method and an apparatus for PSS detection as provided by the present invention in detail through preferred embodiments. It should be understood that these embodiments are presented only to enable those skilled in the art to better understand and implement the present invention, not intend for limiting the scope of the present invention in any manner.

It should be first noted that in this invention it is illustrated particular sequences for performing the steps of the methods. However, these methods are not necessarily performed strictly according to the illustrated sequences, and they can be performed in reverse sequence or simultaneously based on natures of respective method steps.

Additionally, in the present invention, $[.]^T$ denotes transpose of a vector or matrix; $[.]^H$ denotes a Hermitian transpose of a vector or matrix; and $[.]^*$ denotes a complex conjugate of a vector or matrix.

Figure 1:
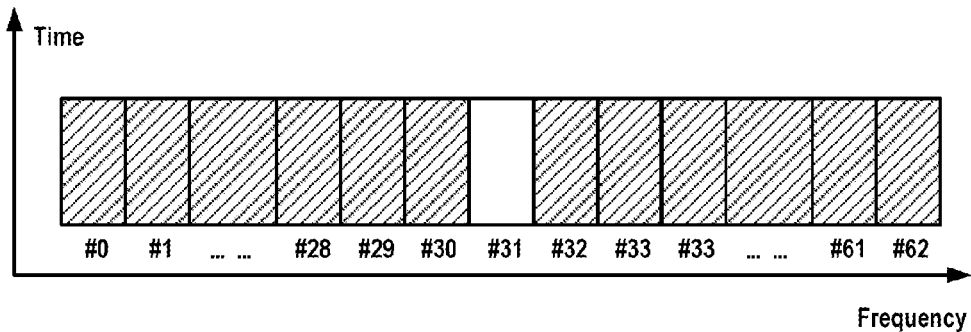
Figure 2:
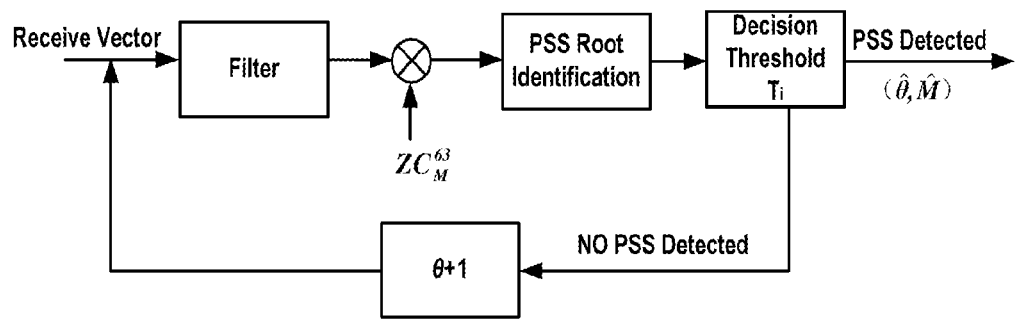
FIG. 2 schematically illustrates a technical solution for PSS detection according to the prior art.

Before specifically illustrating the present invention, first, the ZC sequence will be described in detail. As illustrated in FIG. 1, the ZC sequence used in the LTE system is a sequence with a length of 63 and having a good self-correlation. In a frequency domain, the ZC sequence may be given by the following equation:

$$ZC_M^{63}(n) = \exp\left[\frac{j\pi M n(n+1)}{N_{ZC}}\right] \quad \text{Equation (1)}$$

Where $N_{ZC}$ is the length of the ZC sequence and equal to 63, n is the index of subcarrier, "exp( )" represents an exponential function with Napierian base e as base.

Based on the above equation (1), the value of the Nzc−1−n subcarrier in the ZC sequence is calculated as follows:

$$ZC_M^{63}(N_{ZC}-1-n) = \exp\left[\frac{j\pi M(N_{ZC}-1-n)(N_{ZC}-n)}{N_{ZC}}\right] \quad \text{Equation (2)}$$

$$= \exp\left[\frac{j\pi M\left(\frac{N_{ZC}^2 - (2n+1)}{N_{ZC}-n(n+1)}\right)}{N_{ZC}}\right]$$

-continued $$= \exp[j\pi M(N_{ZC} - (2n+1))] \cdot$$
$$\exp\left[\frac{j\pi Mn(n+1))}{N_{ZC}}\right]$$
$$= \exp[j\pi M(N_{ZC} - (2n+1))] \cdot$$
$$ZC_M^N(n)$$

wherein, n=0, 1, . . . , Nzc−1; since Nzc is an odd number, the Nzc is represented as N=2B+1 without losing the generality, and thus this equation may be further simplified as:

$$ZC_M^N(N-1-n) = \exp[j\pi M(N-(2n+1))] \cdot \quad \text{Equation (3)}$$
$$ZC_M^N(n)$$
$$= \exp[j\pi M(2B-2n)] \cdot$$
$$ZC_M^N(n)$$
$$= \underbrace{\exp[j2\pi M(B-n)]}_{=1} \cdot$$
$$ZC_M^N(n)$$
$$= ZC_M^N(n)$$

From equation (3), it may be clearly seen that all ZC sequences with an odd length have a central symmetry property and are independent of M value.

Figure 3A:
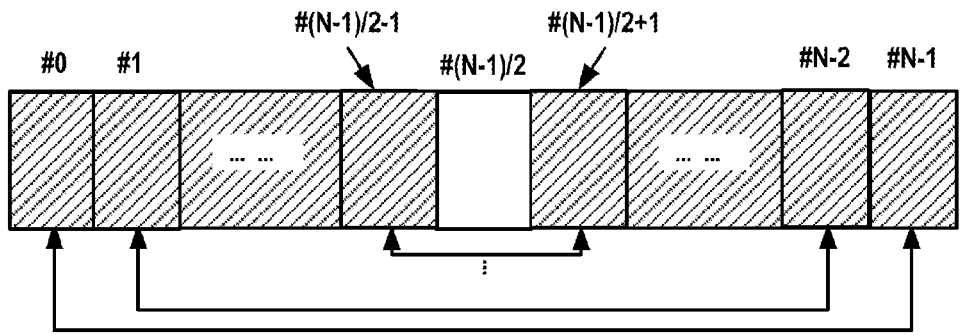
FIGS. 3A and 3B schematically illustrate the central symmetry for a frequency domain ZC sequence and a time domain ZC sequence, respectively.

FIG. 3A illustrates the central symmetric property of the frequency domain ZC sequence. As illustrated in this figure, the subcarriers of ZC sequence are symmetrically distributed with the DC subcarrier (at the position #(N−1)/2) as the center. Namely, the #0 subcarrier data is symmetrical (equal) to the #N−1 subcarrier data, and the #1 subcarrier data is symmetrical to the #N−2 subcarrier data, and so forth.

Figure 3B:
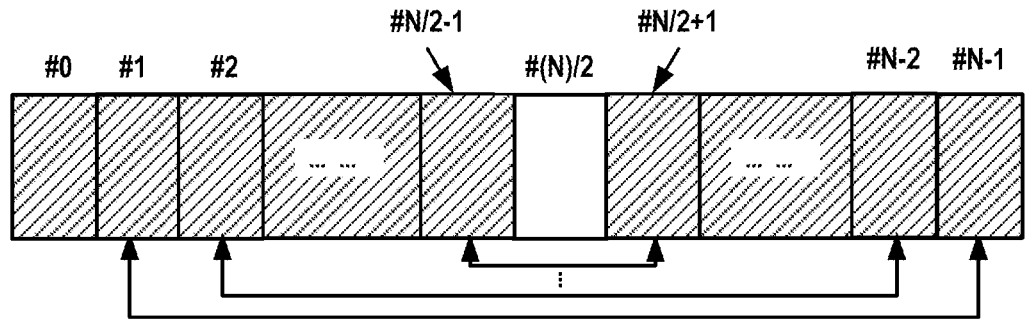

Further, the time domain ZC sequence also has a similar central symmetric property. However, because of experiencing the Fourier transform, the length of the time domain ZC sequence changes to be 2048, thus this central symmetric property is slightly different. But, it still has such central symmetry property after removing #0 data. FIG. 3B schematically illustrates a diagram of the central symmetry of the time domain ZC sequence. As illustrated in the figure, except the #0 data, other data are still symmetric with #N/2 data as the center. Namely, #1 data is symmetrical to #N−1 date, #2 data is symmetrical to #N−2 date, and so forth. Thus, the symmetry of the time domain ZC sequence may be expressed as:

$$y(n)=y(N-n) \quad \text{Equation (4)}$$

wherein N represents the length of Fourier transform (for example, 1024), and n is equal to 1 to N/2−1.

In a conventional PSS detection scheme, the coherence property of ZC sequence has been fully exploited in PSS detection, but the central symmetry of the ZC sequence has not been focused on yet. These inventors notice this problem and have made a dedicated study. These inventors believe that the PSS sequence detection performance will be improved considerably if this central symmetric property is applied to PSS detection.

To this end, the present invention provides an improved technical solution for PSS detection. Because it has a faster detection speed than the PSS detection algorithm in the prior art, it may also be called as fast PSS detection scheme or an enhanced PSS detection scheme. Hereinafter, this technical solution will be described in detail with reference to FIGS. 4 to 14 mainly with the time domain PSS detection operation as an example.

Figure 4:
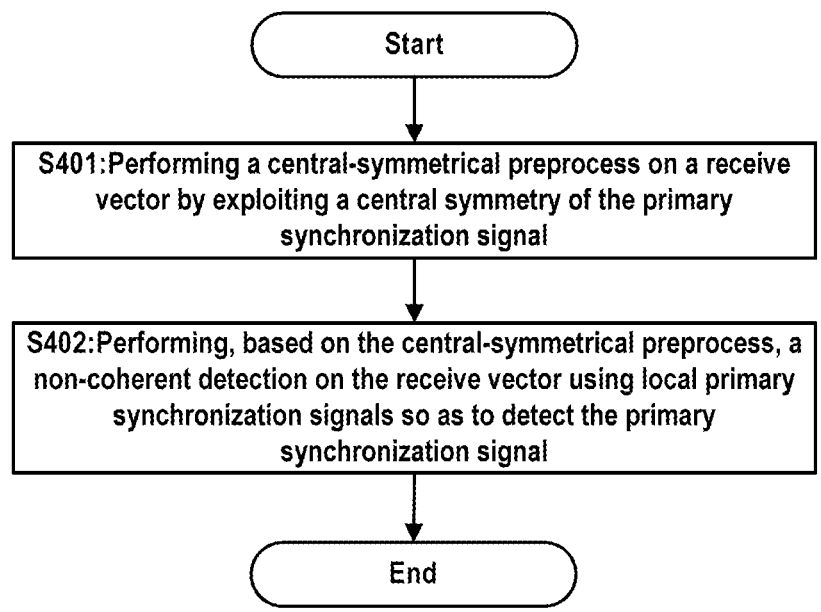
FIG. 4 schematically illustrates a flow chart of a method for PSS detection according to an embodiment of the present invention.

Reference is made to FIG. 4, which schematically illustrates a flow chart of a method for PSS detection according to one embodiment of the present invention. As illustrated in FIG. 4, first at step S401, a symmetric preprocess is performed on the receive vector by exploiting the central symmetry of the primary synchronization signal PSS.

After the receive vector is filtered, vector preprocess may be performed, so as to obtain the preprocessed receive vector through shortening the length of the receive vector by exploiting the central symmetry of the primary synchronization signal. For example, corresponding data at symmetrical positions in the receive vector can be added, such that all valid information of the receive vector can be maintained and the data amount required to be processed can be shortened, thereby obtaining a preprocessed receive vector.

In this case, the length of the locally stored primary synchronization signals (i.e., three ZC sequences) keeps identical to the length of the preprocessed receive vector. In such a way, non-coherent PSS detection may be performed on the preprocessed receive vector based on the local primary synchronization signal with its length shortened.

Each of the primary synchronization signals that are pre-stored locally is an ideal signal which is not subject to any noise and carrier frequency offset, and thus its middle direct current portion and its front half portion or the latter half portion may be directly taken as a shorten primary synchronization signal. Of course, similarly to the vector preprocess operation as the above mentioned, the local ZC sequence may be shortened to a same length as the length of the preprocessed receive vector. However, because the local ZC sequence is an ideal sequence, the data at symmetrical positions are completely equal. Such preprocess is substantially identical to directly taking the middle direct current portion and the front half portion or the latter half portion. Besides, the direct selection approach is simpler and more direct, without any operation processing.

Because this vector preprocess approach may reduce half of the computational complexity, it can also be called an Almost Half Complexity (AHC) scheme. This AHC scheme will be described hereinafter in more detail with reference to FIGS. 5 to 8.

Moreover, it may be determined that whether the receive vector is a PSS sequence based on the central symmetry of the ZC sequence per se, and PSS root identification that consumes considerable computational resources will be further performed only when it is determined that the receive vector is a PSS sequence.

As mentioned hereinabove, the ZC sequence has a central symmetry property, thus if the receive vector is PSS sequence, it still has a very high central symmetry property though it has been affected by noise and carrier frequency offset. Thus, it may be first detected whether the receive vector has a central symmetry property. For example, the self-correlation value of the receive vector may be calculated. Namely, the sum of coherent values of corresponding data at symmetrical positions in the receive vector is calculated as the symmetric value for assessing its central symmetry. Then, it can be determined whether the receive vector has a central symmetry property based on the symmetric value as calculated. For example, a symmetry threshold may be set, so as to determine that the receive vector has a central symmetry property when the symmetric value is not less than the symmetry detection threshold. This symmetric threshold may be an empirical value or determined through repetitive experiments.

In the above scheme, the receive vector is first subjected to the symmetry detection operation (also called a center self-correlation operation), and thus this scheme can also be called as CSC (central self-connection) scheme. This CSC scheme will be described in detail with reference to FIGS. 9 to 12.

Next, at step S402, based on the central-symmetrical pre-process performed at step S401, non-coherent detection may be performed on the receive vector using the local primary synchronization signals, so as to detect the primary synchronization signal. In these embodiments of the present invention, the coherent value in the non-coherent detection may be calculated in the same manner as used in the prior art. Namely, the matching operation may be performed using the complex conjugate multiply operation.

Additionally, it should be noted that the purpose for performing preprocess on the receive vector is to derive detection data for the subsequent PSS detection, and thus this process actually does not change any data in the original receive vector.

Figure 5:
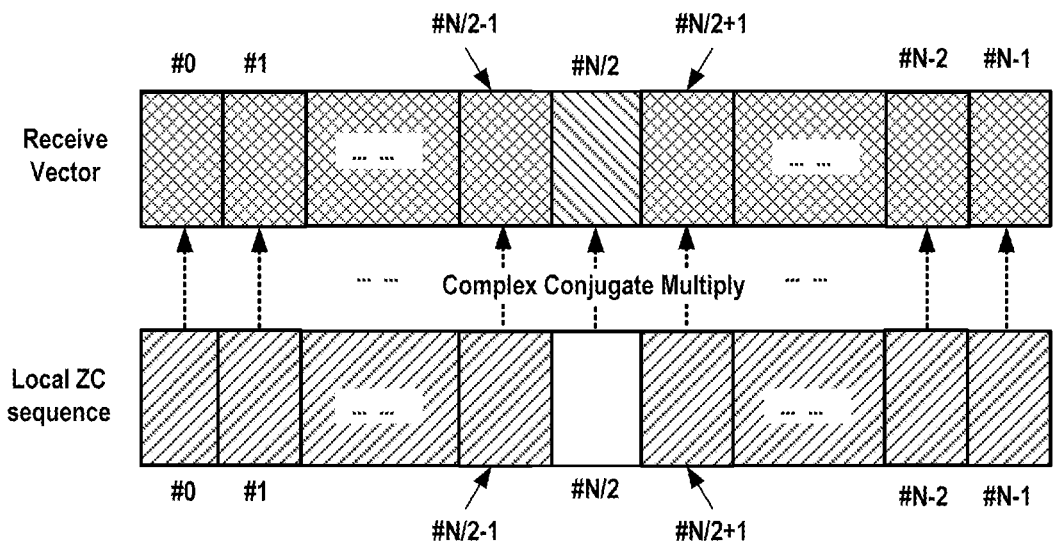
FIG. 5 schematically illustrates a diagram of a principle for PSS detection in the prior art.

Next, referring to FIG. 5, FIG. 5 schematically illustrates the operation in PSS identification in the prior art. As illustrated in FIG. 5, the data in the receive vector are complex conjugate multiplied by the data at corresponding positions in the local ZC sequence, respectively. The prior algorithm may be represented as follows:

$$\{\hat{M}, \hat{\theta}\} = \underset{M,\theta}{\operatorname{argmax}} \left\{ \left| \sum_{n=0}^{N-1} s_M[n] y_k^*[\theta + n] \right|^2 \right\} \quad \text{Equation (5)}$$

wherein, $S_M$ denotes the local ZC sequence, $y_k$ is receive vector (sequence), and θ is the start position index of the PSS detection.

It may be seen from equation (5) that each root requires N complex conjugate multiplies and N−1 complex number add operation. Because there are locally stored three ZC sequences corresponding to roots of 25, 29, and 34, and the ZC sequences with roots of 29 and 34 are mutually complex conjugate ZC sequences and thus only one of the two sequences needs to be detected, thus the conventional algorithm needs to perform 2N complex conjugate multiply operations and 2 (N−1) complex number add operation. As to for example the time domain PSS detection, it requires 2*2048 complex conjugate multiply operations and 2*2046 complex number add operations.

Figure 6:
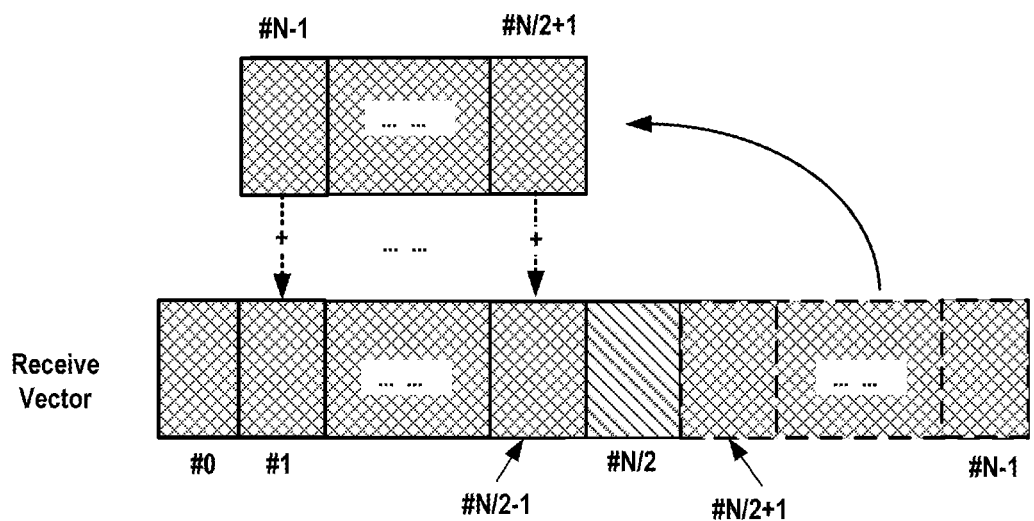
FIG. 6 schematically illustrates a diagram of a principle for performing central-symmetrical preprocess according to an embodiment of the present invention.

In contrast, the preprocess approach as adopted in this invention will reduce the operational complexity greatly. Reference is made to FIG. 6, which schematically illustrates a diagram of a principle for the vector preprocess operation (AHC operation) according to one embodiment of the present invention. As illustrated in the figure, the receive vectors may be oppositely folded with #N/2 as the center and are then added one by one. In other words, respective data (illustrated by dotted line, from #N/2+1 to #N−1) after #N/2 in the receive vectors are added to the corresponding data (#N/2−1 to #1) at symmetrical positions, respectively. This operation may be expressed as:

$$Y(\theta+n)=y(\theta+n)+y(\theta+N-n) \quad \text{Equation (6)}$$

wherein y denotes a receive vector, n is 1 to N/2−1, and θ is the start position index of PSS detection.

Figure 7:
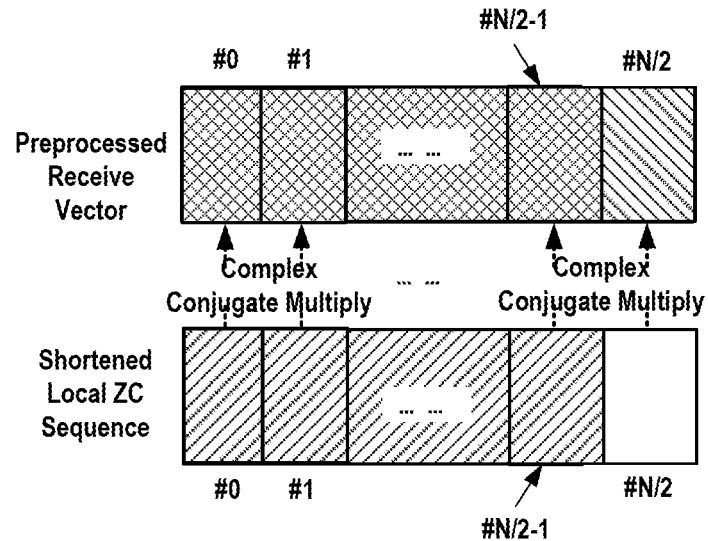
FIG. 7 schematically illustrates a diagram of a principle for PSS detection according to the embodiment of the present invention.

After the above vector preprocessing, the resulting preprocessed vector is illustrated in FIG. 7, which has a length of N/2+1. However, this processed receive vector still contains all information content in the original vector. As illustrated in FIG. 7, the processed receive vector may be complex conjugate multiplied by the local ZC sequence that also has a length of N/2+1, so as to perform PSS root identification. This complex conjugate multiply may be expressed as follows:

$$s_M[0]y_k^*[\theta] + s_M[N/2]y_k^*[\theta + N/2] + \quad \text{Equation (7)}$$
$$\sum_{n=1}^{N/2-1} s_M[n](y_k[\theta + n] + y_k[\theta + N - n])^*$$

and wherein $$\sum_{n=1}^{N/2-1} s_M[n](y_k[\theta + n] + y_k[\theta + N - n])^*$$

may be represented by $\Omega_{k,\theta}$, namely:

$$\Omega_{k,\theta} = \sum_{n=1}^{N/2-1} s_M[n](y_k[\theta + n] + y_k[\theta + N - n])^* \quad \text{Equation (8)}$$

Figure 8:
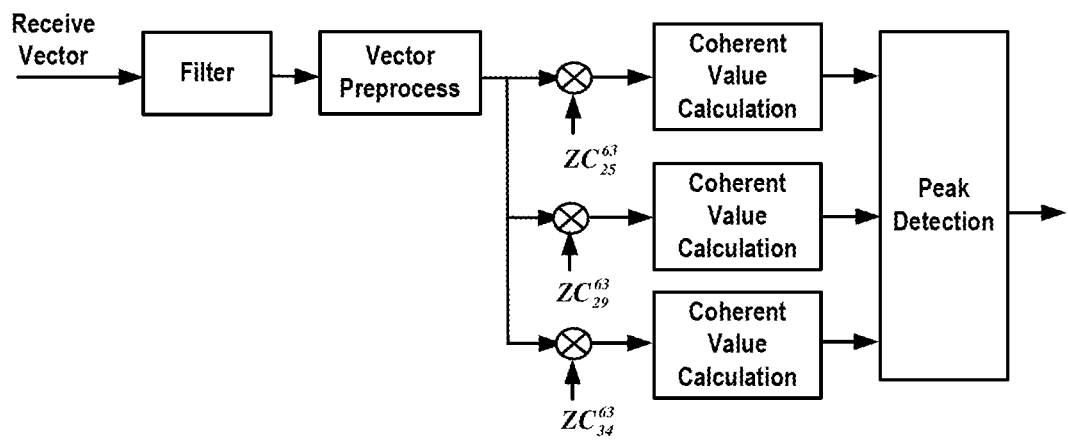
FIG. 8 schematically illustrates a diagram of a method for PSS detection according to this embodiment of the present invention.

FIG. 8 schematically illustrates a diagram of the above AHC solution. As illustrated in FIG. 8, first, the receive vector may be filtered through a filter to exclude the influence of other content on the PSS, and then the vector preprocess as illustrated in FIG. 6 may be performed on the receive vector at the vector preprocess unit, to obtain a preprocessed receive vector with a length equal to N/2+1. Then, the preprocessed receive vector may be compared with the three local sequences that are locally stored and also have a length of N/2+1. For example, their coherent values may be calculated based on equation (7). Next, peak detection may be performed. If a peak is detected, then it may be determined that the receive vector matches the ZC sequence with a corresponding root; therefore, the cell ID may be determined to access the corresponding cell.

The process of FIG. 8 may be generally expressed by the following equation:

$$\{\hat{M}, \hat{\theta}\} = \quad \text{Equation (9)}$$
$$\underset{M,\theta}{\operatorname{argmax}}\{|s_M[0]y_k^*[\theta] + s_M[N/2]y_k^*[\theta + N/2] + \Omega_{k,\theta}|^2\}$$

Thus, for a given Fourier transform length (2048 in the LTE system), according to the method of this invention, only N/2+1 complex conjugate operations are required for each sequence root in performing the sequence match operation. Further, the cost of this effect is merely N/2 add operations each of which has a complexity considerably lower than the multiply operation. Consequently, this AHC solution according to the present invention significantly reduces the computational complexity in PSS detection and saves precious computational resources of UE equipment, thereby improving the speed and performance of PSS detection and improving the efficiency of cell search.

Figure 9:
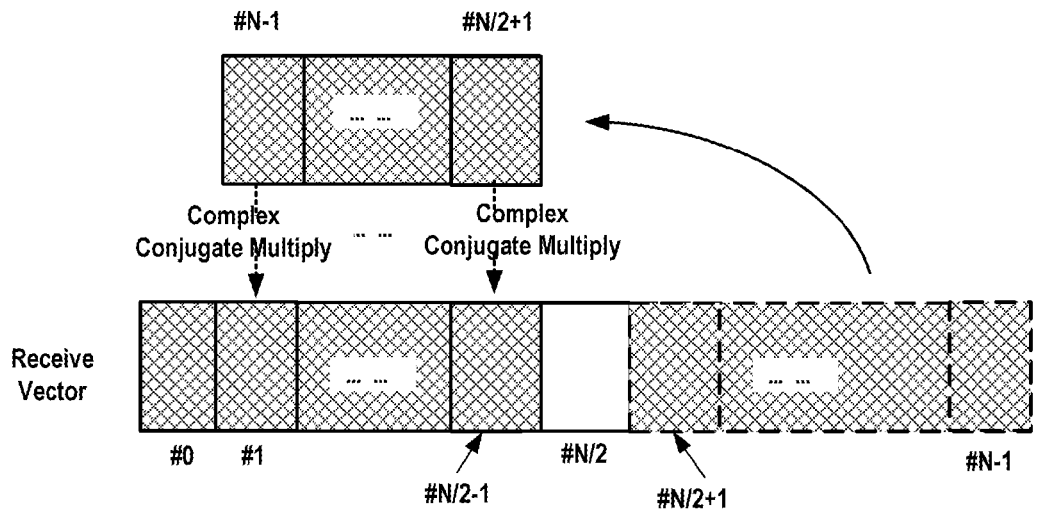
FIG. 9 schematically illustrates a diagram of a principle for performing a central-symmetrical preprocess according to another embodiment of the present invention.

Besides, FIG. 9 further illustrates a diagram of a principle of performing preprocess on the receive vector according to another embodiment of the present invention. FIG. 9 is a diagram of symmetry detection in the aforementioned CSC scheme. Referring to FIG. 9, the receive vectors may be likewise oppositely folded with #N/2 as the center, and the complex conjugate multiply operation is performed one by one. In other words, respective data (i.e., from #N/2+1 to #N−1) positioned after #N/2 in the receive vectors are complex conjugate multiplied by the corresponding data (from #N/2-1 to #1) at symmetrical positions, and the results can be used as symmetry values for measuring the symmetry. This operation may be represented by the following equation:

$$M(\theta) = \left| \sum_{n=1}^{N/2-1} y_k^*[\theta+n] y_k[\theta+N-n] \right|^2 \qquad \text{Equation (10)}$$

Based on the resulting M(θ), it may be determined whether the receive vector has a central symmetry property by exploiting the peak algorithm or threshold algorithm. The subsequent PSS root identification operation can only be performed in the case of determining that the receive vector possess the symmetry property.

Figure 10:
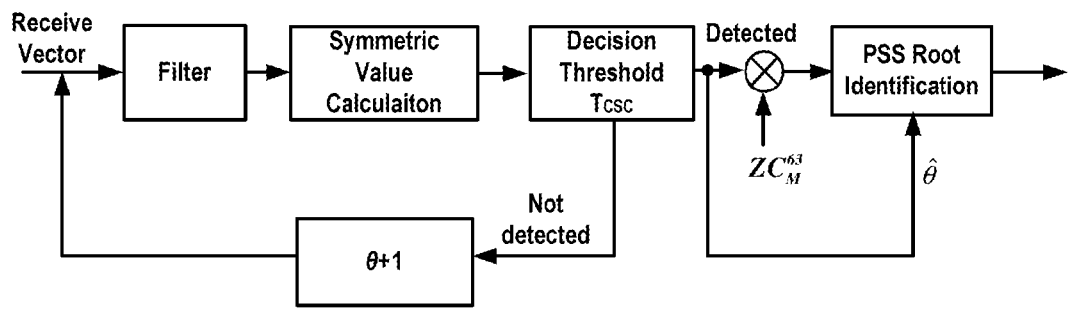
FIG. 10 schematically illustrates a diagram of a method for PSS detection according to this embodiment of the present invention.

FIG. 10 schematically illustrates a diagram of PSS detection according to this embodiment. As illustrated in FIG. 10, first, the receive vector may be likewise filtered through a filter so as to exclude the influence of other content on the PSS, and then the symmetry detection operation as described with reference to FIG. 9 may be performed on the receive vector. In particular, self-correlation operation may be performed to the receive vector, i.e., calculating its symmetry value as expressed in equation 7. Then, the calculated symmetry value is compared with a symmetry determination threshold Tcsc; if the calculated symmetry value is greater than the threshold Tcsc, then it is deemed that the receive vector has a central symmetry property and conforms to the feature of a PSS sequence, and thereby it is determined that a PSS sequence is detected; otherwise, it is deemed that no PSS sequence is detected.

In the case of not detecting the PSS, the sequence start point index θ may be moved forward, and the symmetry detection is continued. On the other hand, in the case of detecting the PSS sequence, the start position of the PSS sequence may be determined based on the θ̂ value as determined in the symmetry detection process; then, the match operation is performed to the PSS sequence and three local ZC sequences, thereby identifying the PSS root.

According to this CSC scheme, the PSS detection is divided into two phases. In the first phase, the operation first performed on the receive vector is the detection of central symmetry property of the receive vector itself instead of PSS root detection, wherein once it is found that the current receive vector has a strong central symmetry, the second phase is conducted to perform PSS root detection. Therefore, based on this CSC scheme, it may be prevented to perform PSS root detection on a huge amount of data symbols, thereby considerably saving precious computational resources at UE and improving the speed and efficiency of PSS detection.

Figure 11:
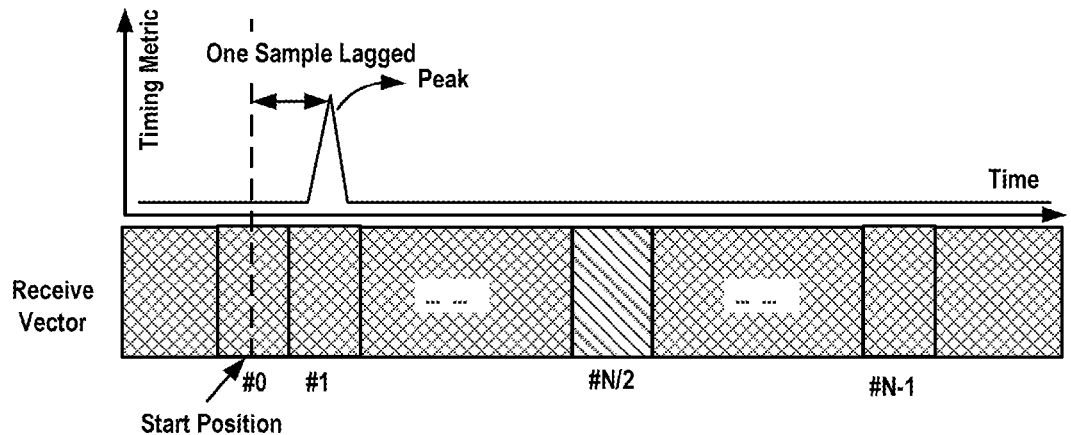
FIG. 11 schematically illustrates a diagram of a method for performing a central-symmetrical preprocess according to a further embodiment of the present invention.

FIG. 11 illustrates a diagram for timing metric character according to the CSC method. As illustrated in FIG. 11, once peak appears in M (θ), it is determined that PSS is detected at the receiver (i.e., at UE). At this point, the start position of the PSS sequence may be determined based on the correspondence relationship between the peak position and the initial position θ.

Besides, it should be noted that the CSC algorithm may be used in combination with the AHC algorithm of the present invention, and it can also be used in combination with the prior art.

Further, it should be also noted that the present invention has been introduced above mainly in combination with the time domain PSS operation. However, those skilled in the art would appreciate that the method of the present invention may also be performed in the frequency domain, but it just needs performing Discrete Fourier Transform on the receive data, so as to convert the receive data from the time domain into frequency domain. It should be noted that the PSS detection of the present invention is preferably performed in time domain, because performing in frequency domain requires performing Fourier transform to all receive data, which might consume certain computational resources.

Figure 12:
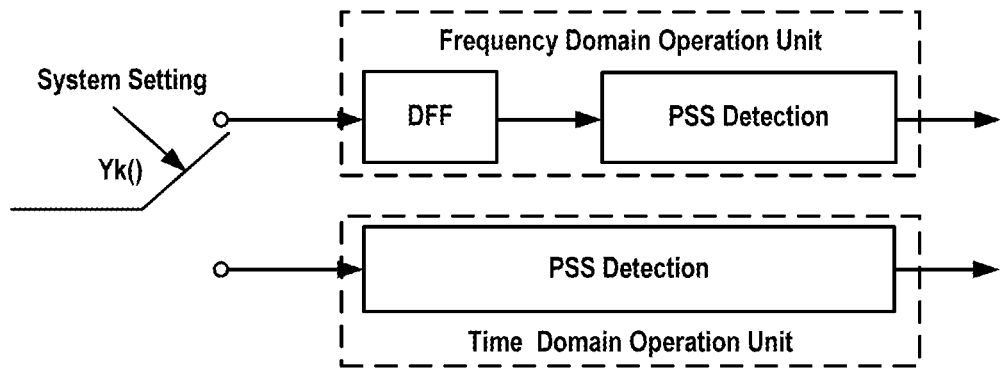
FIG. 12 schematically illustrates a diagram for timing metric character of a central self-correlation (CSC) method according to the present invention.

FIG. 12 illustrates another embodiment of the present invention. Referring to FIG. 12, a mode switch may be set in the system. This mode switch may, based on the setting or selection of performing frequency domain PSS detection or time domain PSS detection in the system, switch the receive vector to the corresponding time domain operation unit or frequency domain operation unit. By the way, as previously mentioned, the frequency domain operation unit comprises a Discrete Fourier Transform unit in addition, which is different from the time domain operation unit.

Figure 13:
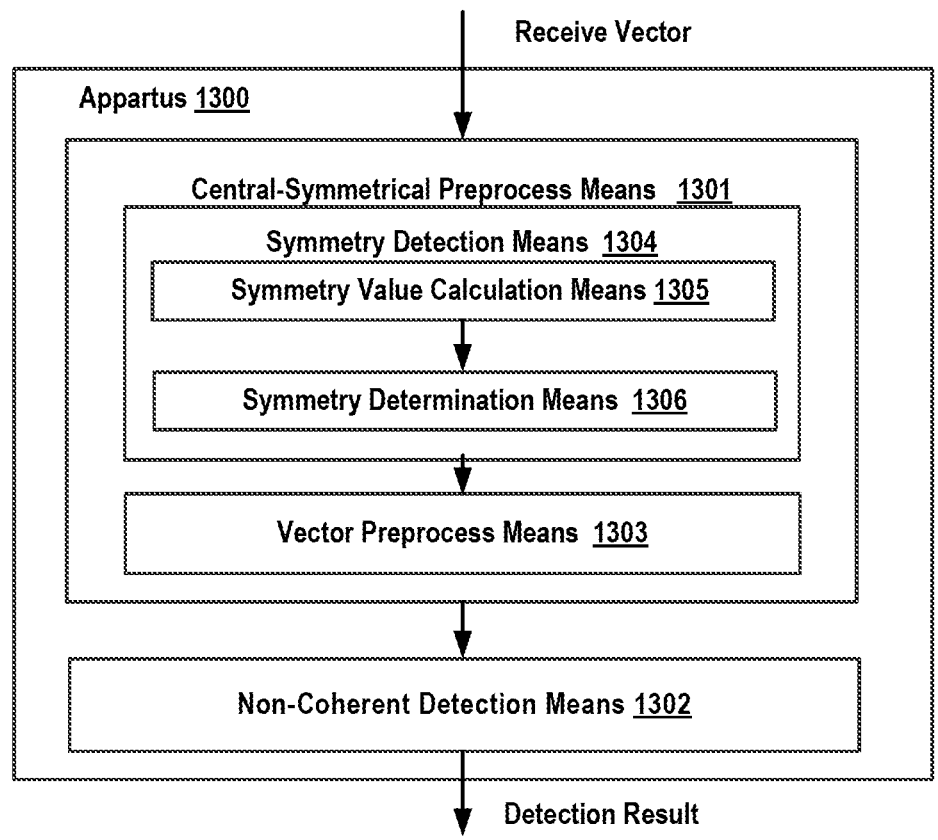
FIG. 13 schematically illustrates a block diagram of an apparatus for PSS detection according to an embodiment of the present invention.

Further, the present invention also provides an apparatus for PSS detection, which will be described in detail with reference to FIG. 13. FIG. 13 schematically illustrates a block diagram of an apparatus for PSS detection according to one embodiment of the present invention. As illustrated in FIG. 13, the apparatus 1300 may comprise: central-symmetrical preprocess means 1301 configured for performing a central-symmetrical preprocess on a receive vector by exploiting a central symmetry of the primary synchronization signal; and non-coherent detection means 1302 configured for performing, based on the central-symmetrical preprocess, a non-coherent detection on the receive vector using local primary synchronization signals, so as to detect the primary synchronization signal.

In one embodiment according to the present invention, the central-symmetrical preprocess means 1301 may further comprise: vector preprocess means 1303 configured for obtaining a preprocessed receive vector through shortening the length of the receive vector by exploiting the central symmetry of the primary synchronization signal. In this embodiment, the local primary synchronization signals have a same length as the preprocessed receive vector, and the non-coherent detection means 1302 is configured for performing non-coherent detection on the preprocessed receive vector based on the local primary synchronization signals.

In another embodiment of the present invention, the vector preprocess means 1303 is further configured for adding corresponding data at symmetric positions in the receive vector to obtain the preprocessed receive vector.

In a further embodiment of the present invention, the central-symmetrical preprocess means 1301 may further comprise: symmetry detection means 1304 configured for detecting whether the receive vector has a central symmetry property or not. In this embodiment, the non-coherent detection means may be configured for performing the non-coherent detection in response to determining that the receive vector has a central symmetry property.

In a still further embodiment, the symmetry detection means 1304 may further comprise symmetry value calculation means 1305 and symmetry determination means 1306. The symmetry value calculation means 1305 may be configured for calculating the sum of coherent values of corresponding data at symmetric positions in the receive vector as a symmetry value. The symmetry determination means 1306 may be configured for determining, based on the symmetry value, whether the receive vector has a central symmetry property or not.

In a yet further embodiment, the symmetry determination means 1306 may be further configured for determining that the receive vector has a central symmetry property when the symmetry value is not less than a symmetry detection threshold.

Further, in a still yet further embodiment, the primary synchronization signal detection may be performed in a frequency or time domain in response to the setting about a frequency or domain detection in a communication system.

It should be noted that operations of respective means as comprised in the apparatus 1300 substantially correspond to respective method steps as previously described. Therefore, specific operations of respective means in the apparatus 1300 may refer to the previous description on the method of the present invention with reference to FIGS. 4 to 12.

Further, according to a further aspect of the present invention, there is further provided a user equipment, comprising the apparatus 1300 for PSS detection according to the present invention as described with reference to FIG. 13.

Besides, these inventors make comparison on the complexities of the time domain PSS detection method according to the present invention and the conventional method. The comparison results are illustrated in Table 1:

TABLE 1

| Complexity Comparison | | |
| --- | --- | --- |
|  | Numbers of complex conjugate multiply operations | Numbers of complexity add operations |
| Conventional scheme | 2N | 2(N − 1) |
| AHC scheme | N + 2 | (3N − 2)/2 |
| CSC scheme (in combination with AHC) | N/2 − 1 | N/2 − 2 |

It is clearly seen from the above table that the computational complexity of the AHC scheme is reduced about half over the conventional scheme; while the computational complexity of the CSC scheme in combination with AHC is reduced to about ¼ of the conventional scheme.

Figure 14:
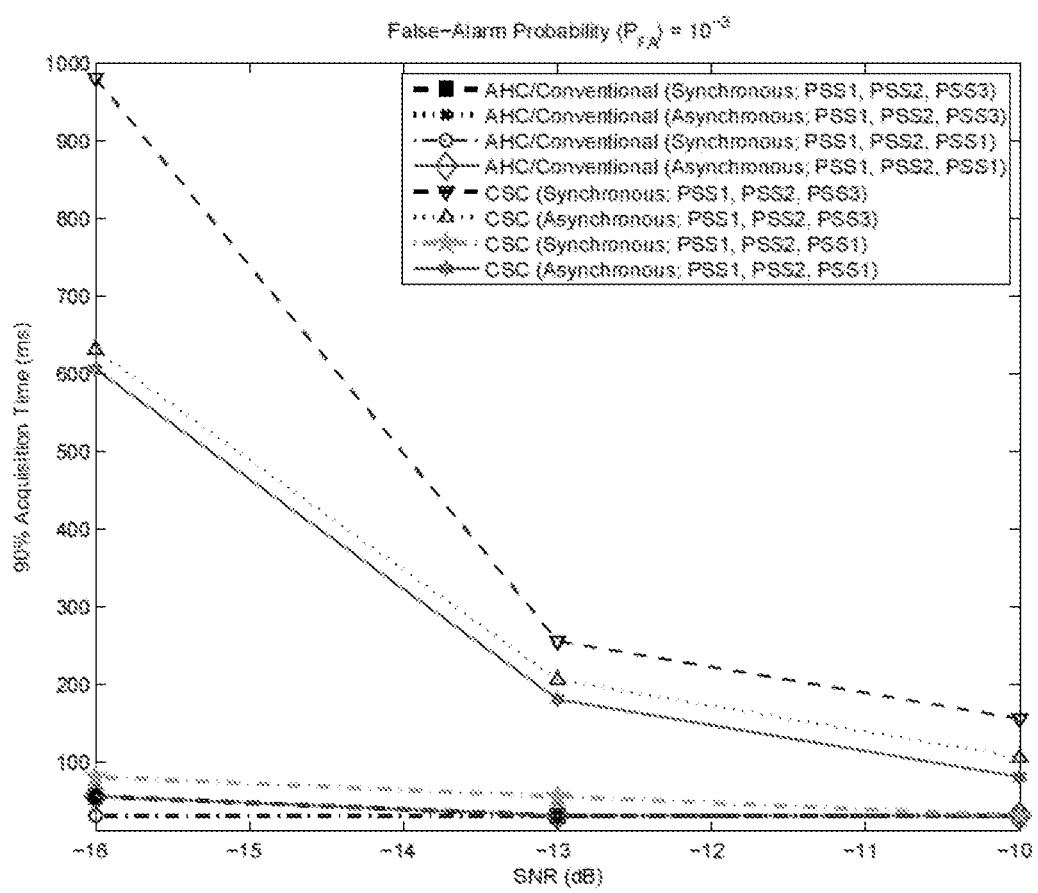
FIG. 14 illustrates results of simulation on the solution in the prior art and the solution of this invention.

Further, FIG. 14 schematically illustrates results of simulations on the performance comparison between the prior art and the technical solutions of the present invention, wherein the normalized frequency offset is set to be 0.1 (corresponding to 1.5 kHz). FIG. 14 illustrates the performances of AHC, conventional scheme, and CSC scheme in a synchronous or asynchronous scenario by exploiting various ZC sequence combinations to indicate each cell. As illustrated in the figure, the AHC algorithm has no any effect on the system performance, thus its performance curve are completely identical to the performance curves of the traditional algorithm. Further, except the AHC/conventional mode in combination with synchronous scenario and (PSS1, PSS2, PPS 1), the performances of other AHC/conventional modes are almost identical.

From FIG. 14, it is clearly seen that the AHC scheme achieves exactly the same accuracy as that obtained in the conventional non-coherent algorithm. As compared to AHC, CSC scheme further reduces the computational complexity by about 50%, but the accuracy is sacrificed to this end. Further, it is also found that the performance in synchronous scenario is always better than that obtained in the asynchronous scenario. The reason is that in the asynchronous transmission scenario, the PSS transmitted by the objective cell will be affected by the data symbols from the interring cells, and this kind of interference will definitely degrade the SINR of the received PSS; however, for the synchronous transmission scenario, PSS transmitted from different cells may be overlapped together and received by a single UE simultaneously, and the CSC detection performance may be improved by an add-up effect at the receiver.

It should be noted that, it has been described hereinabove the determination of the symmetry based on resolving the self-correlation value of the receive vector itself. However, the present invention is not limited thereto, and any suitable manner known or future developed in the art may be employed. Besides, it is merely an example to perform central symmetry detection with reference to threshold determination as mentioned above, and the present invention is not so limited. Instead, any other suitable manner may be employed, for example, peak detection approach.

Further, it should be noted that specific equations have been provided for calculating the coherent value and symmetry value. However, it should be noted that the present invention is not so limited, while any suitable manner known or future developed in the art may be employed to implement the present invention. Further, the present invention may also be performed by neglecting some items therein. For example, for the above Equation (8), the processing on #0 data and #N/2 data may be neglected.

Further, the present invention mainly describes the technical solution of time domain PSS operation, but does not make a detailed description on the frequency domain PSS operation. However, those skilled in the art may easily implement the frequency domain PSS operation based on their own knowledge and the teachings here.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may understand that the above method and system may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The apparatus and its components in the present embodiment may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

Though the present invention has been depicted with reference to the currently considered embodiments, it should be understood that the present invention is not limited the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A method for a primary synchronization signal detection in a user equipment, comprising:

performing a central-symmetrical preprocess, by at least one processor, on a receive vector by exploiting a central symmetry of a primary synchronization signal; and performing, based on the central-symmetrical preprocess, a non-coherent detection, by the at least one processor, on the receive vector using local primary synchronization signals so as to detect the primary synchronization signal, wherein the performing the central-symmetrical preprocess on the receive vector by exploiting the central symmetry of the primary synchronization signal comprises:

obtaining a preprocessed receive vector through shortening the length of the receive vector by exploiting the central symmetry of the primary synchronization signal, and detecting whether the receive vector has a central symmetry property or not by:

calculating a sum of coherent values of corresponding data at symmetric positions in the receive vector as a symmetry value; and determining that the receive vector has a central symmetry property when the symmetry value is not less than a symmetry detection threshold, wherein the local primary synchronization signals have a same length as the preprocessed receive vector, and the non-coherent detection is performed on the preprocessed receive vector based on the local primary synchronization signal, and wherein the non-coherent detection is performed in response to determining that the receive vector has a central symmetry property.

2. The method according to claim 1, wherein the obtaining the preprocessed receive vector through shortening the length of the receive vector comprises adding corresponding data at symmetric positions in the receive vector to obtain the preprocessed receive vector.

3. The method according to claim 1, wherein the primary synchronization signal detection is performed in a frequency or time domain in response to the setting about a frequency or domain detection in a communication system.

4. An apparatus for a primary synchronization signal detection, comprising:

at least one memory operable to store program instruction;

at least one processor operable to read said program instruction and configured by the program instruction to operate as:

central-symmetrical processor configured for performing a central-symmetrical preprocess on a receive vector by exploiting a central symmetry of a primary synchronization signal; and non-coherent detector configured for performing, based on the central-symmetrical preprocess, a non-coherent detection on the receive vector using local primary synchronization signals, so as to detect the primary synchronization signal, wherein the central-symmetrical preprocessor is further configured to:

obtain a preprocessed receive vector through shortening the length of the receive vector by exploiting the central symmetry of the primary synchronization signal, and detect whether the receive vector has a central symmetry property or not by:

calculating a sum of coherent values of corresponding data at symmetric positions in the receive vector as a symmetry value; and determining that the receive vector has a central symmetry property when the symmetry value is not less than a symmetry detection threshold, wherein the local primary synchronization signals have a same length as the preprocessed receive vector, and the non-coherent detection is performed on the preprocessed receive vector based on the local primary synchronization signal, and wherein the non-coherent detection is performed in response to determining that the receive vector has a central symmetry property.

5. The apparatus according to claim 4, wherein the central-symmetrical preprocessor is further configured to:

add corresponding data at symmetric positions in the receive vector to obtain the preprocessed receive vector.

6. The apparatus according to claim 4, wherein the primary synchronization signal detection is performed in a frequency or time domain in response to the setting about a frequency or domain detection in a communication system.

7. A user equipment, comprising:

an apparatus for a primary synchronization signal detection, the apparatus comprising:

at least one memory operable to store program instruction;

at least one processor operable to read said program instruction and configured by the program instruction to operate as:

central-symmetrical processor configured for performing a central-symmetrical preprocess on a receive vector by exploiting a central symmetry of the primary synchronization signal; and non-coherent detector configured for performing, based on the central-symmetrical preprocess, a non-coherent detection on the receive vector using local primary synchronization signals, so as to detect the primary synchronization signal, wherein the central-symmetrical preprocessor is further configured to:

obtain a preprocessed receive vector through shortening the length of the receive vector by exploiting the central symmetry of the primary synchronization signal, and detect whether the receive vector has a central symmetry property or not by:

calculating a sum of coherent values of corresponding data at symmetric positions in the receive vector as a symmetry value; and determining that the receive vector has a central symmetry property when the symmetry value is not less than a symmetry detection threshold, wherein the local primary synchronization signals have a same length as the preprocessed receive vector, and the non-coherent detection is performed on the preprocessed receive vector based on the local primary synchronization signal, and wherein the non-coherent detection is performed in response to determining that the receive vector has a central symmetry property.

* * * * *